US012583109B2

(12) United States Patent
Hsieh et al.

(10) Patent No.: US 12,583,109 B2
(45) Date of Patent: Mar. 24, 2026

(54) SYSTEM AND METHOD FOR PICKING AND PLACING OBJECTS

(71) Applicant: Chiun Mai Communication Systems, Inc., New Taipei (TW)

(72) Inventors: Tung-Chun Hsieh, New Taipei (TW);
Chung-Wei Wu, New Taipei (TW);
Hsin-Ko Yu, New Taipei (TW);
Chih-Wei Li, New Taipei (TW);
Sung-Chuan Lee, New Taipei (TW);
Tze-Chin Lo, New Taipei (TW);
Chien-Ming Ko, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 632 days.

(21) Appl. No.: 18/091,143

(22) Filed: Dec. 29, 2022

(65) Prior Publication Data

US 2023/0406646 A1     Dec. 21, 2023

(30) Foreign Application Priority Data

Jun. 21, 2022     (TW) ................................... 111123080

(51) Int. Cl.
*B25J 9/16*          (2006.01)
*B25J 1/08*          (2006.01)
(Continued)

(52) U.S. Cl.
CPC .............. *B25J 9/1664* (2013.01); *B25J 1/08* (2013.01); *B25J 9/0084* (2013.01); *B25J 9/0093* (2013.01);
(Continued)

(58) Field of Classification Search
CPC . B25J 9/1664; B25J 1/08; B25J 9/0084; B25J 9/0093; B25J 9/16; B25J 9/1697;
(Continued)

(56)                References Cited

U.S. PATENT DOCUMENTS 8,418,830 B2 *   4/2013   Salamanca ............. B25J 9/0093
                                                         414/730
10,957,003 B2 *   3/2021   Hayashi ............... G01B 11/002
                (Continued)

FOREIGN PATENT DOCUMENTS

CN          104220348 A  * 12/2014   ............. B26D 5/007
CN          108161931 A     6/2018
                (Continued)

*Primary Examiner* — Thomas Randazzo
(74) *Attorney, Agent, or Firm* — ScienBiziP, P.C.

(57)                ABSTRACT

A system and a method for picking and placing objects, includes capturing at least one first image of the object at a first time point and at least one second image at a second time point; identifying the object in the first image and the second image, obtaining first position information, second position information, and object attribute of the object; based on the first position information, the second position information, the first time point, and the second time point, calculating a moving speed of the object; based on the object attribute, determining whether the object is a target object; if so, calculating a target position and a target time point of the target object based on the first and second position information and the moving speed; controlling a target machine arm to move at or to the target position at the target time point to pick the target object.

20 Claims, 8 Drawing Sheets

(51) Int. Cl.

| | | |
|---|---|---|
| *B25J 9/00* | (2006.01) | |
| *B65G 47/90* | (2006.01) | |
| *G06T 7/55* | (2017.01) | |
| *G06T 7/593* | (2017.01) | |
| *G06T 7/90* | (2017.01) | |

(52) U.S. Cl.
CPC ............... *B25J 9/16* (2013.01); *B25J 9/1697* (2013.01); *B65G 47/905* (2013.01); *G06T 7/55* (2017.01); *G06T 7/593* (2017.01); *G06T 7/90* (2017.01); *G05B 2219/39102* (2013.01); *G05B 2219/45063* (2013.01)

(58) Field of Classification Search
CPC ........ B25J 9/0018; B65G 47/905; G06T 7/55; G06T 7/593; G06T 7/90; G05B 2219/39102; G05B 2219/45063; G05B 2219/40607
See application file for complete search history.

(56) References Cited

U.S. PATENT DOCUMENTS

| | | | | |
|---|---|---|---|---|
| 2015/0246778 A1* | 9/2015 | Koga | ................... | B65G 47/905 |
| | | | | 700/259 |
| 2019/0047141 A1* | 2/2019 | Ooba | ..................... | B65G 43/08 |
| 2023/0303342 A1* | 9/2023 | Kulkarni | ................. | B07C 5/36 |

FOREIGN PATENT DOCUMENTS

| | | | | | |
|---|---|---|---|---|---|
| CN | 109176522 A | | 1/2019 | | |
| CN | 109178960 A | | 1/2019 | | |
| CN | 109739220 A | * | 5/2019 | ............... | G06T 5/00 |
| CN | 111843996 A | * | 10/2020 | ............ | B25J 9/1666 |
| CN | 112222142 A | | 1/2021 | | |
| CN | 113289918 A | | 8/2021 | | |
| CN | 113552636 A | | 10/2021 | | |
| CN | 114770515 A | * | 7/2022 | ............ | B25J 9/1664 |
| JP | 3607131 B2 | * | 1/2005 | ......... | G06K 7/10732 |

* cited by examiner

10

System for picking and placing objects

Transmission device — 100

200

Imaging device

400

Operating and processing module

300

Machine arms

700

Memory

10a

10a

<u>10b</u>

SYSTEM AND METHOD FOR PICKING AND PLACING OBJECTS

CROSS-REFERENCE TO RELATED APPLICATIONS

This application claims priority to Taiwan Patent Application No. 111123080 filed on Jun. 21, 2022 in Taiwan Intellectual Property Administration, the contents of which are incorporated by reference herein.

FIELD

The subject matter herein generally relates to automation technology, and particularly to a system and a method for picking and placing objects.

BACKGROUND

As a part of developments in machine learning, a method for the identification and classification of one object among many object has also developed. After the object has been classified, the objects need to be picked and placed according to their classifications. However, when objects on an assembly line are to picked and placed using current identification technologies, other objects may be shifted and moved in the assembly line. Due to the speed of the assembly line and the transfer operations, and the complexity of classifications of the objects, precise control of the picking and the placing of objects of different classifications remains problematic.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Implementations of the disclosure will now be described, by way of embodiments only, with reference to the drawings. The disclosure is illustrative only, and changes may be made in the detail within the principles of the present disclosure. It will, therefore, be appreciated that the embodiments may be modified within the scope of the claims.

Unless otherwise defined, all technical terms used herein have the same meaning as commonly understood by one of ordinary skill in the art. The technical terms used herein are to provide a thorough understanding of the embodiments described herein but are not to be considered as limiting the scope of the embodiments.

Several definitions that apply throughout this disclosure will now be presented.

The term "coupled" is defined as connected, whether directly or indirectly through intervening components, and is not necessarily limited to physical connections. The term "substantially" is defined to be essentially conforming to the particular dimension, shape, or other feature that the term modifies, such that the component need not be exact. The term "comprising," when utilized, means "including, but not necessarily limited to", it specifically indicates open-ended inclusion or membership in the so-described combination, group, series, and the like.

The present disclosure provides a method and a system for picking and placing objects, including obtaining moving speeds of the objects on a moving line and object attributes, determining objects to be picked according to the object attributes, determining positions of the objects to be picked according to the moving speeds, controlling a machine arm to pick the objects to be picked according to the positions and the moving speeds of the objects to be picked, which has advantages of easy arrangement and high precision in object picking and placing.

Figure 1:
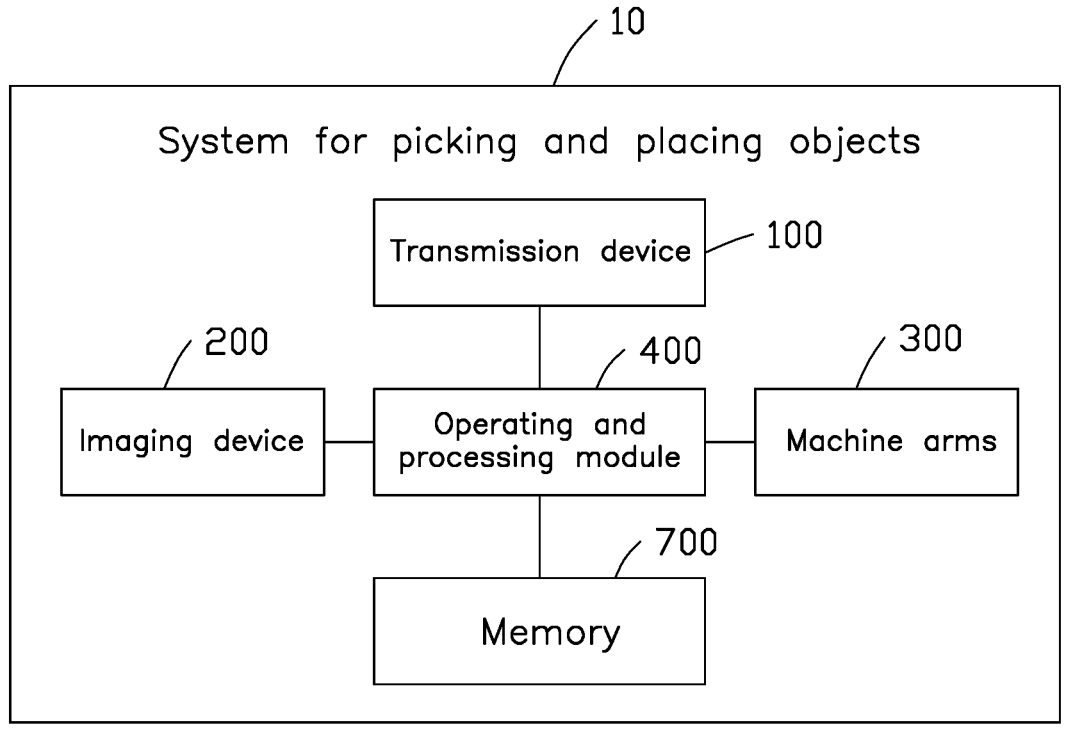
FIG. 1 illustrates a schematic diagram of at least one embodiment of a system for picking and placing objects according to the present disclosure.

FIG. 1 illustrates a schematic diagram of at least one embodiment of a system 10 for picking and placing objects. The system 10 at least includes: a transmission device 100, an imaging device 200, machine arms 300, an operating and processing module 400, and a memory 700.

In at least one embodiment, the transmission device 100 is configured to transmit objects along a predetermined direction. The transmission device 100 may transmit objects from one position to another position at a speed. For instance, the transmission device 100 may be an orientation transmission device such as an assembly line, a conveyor belt, a transport disc, etc.

In at least one embodiment, the imaging device 200 may be arranged above the transmission device 100 and configured to obtain image formation of the transmission device 100 and its cargo. In detail, the imaging device 200 is configured to capture a first image 210 of an object on the transmission device 100 at a first time point. The imaging device 200 is further configured to capture a second image 220 of the object on the transmission device 100 at a second time point. The imaging device 200 may include two cameras for capturing two-dimensional and three-dimensional fused images. Wherein the two-dimensional and three-dimensional fused images may include two-dimensional images and three-dimensional images having depth information. In at least one embodiment, each of the first image 210 and the second image 220 is a two-dimensional and three-dimensional fused image.

In at least one embodiment, the machine arms 300 are configured to pick and place objects. The machine arms 300, based on manner of driving, can be differentiated into different types, such as hydraulic type machine arms, pneumatic type machine arms, electrodynamic type machine arms, and/or robotistic machine arms, etc. The machine arms 300, based on manner of grasping objects, can be differentiated into different types, such as clamping type machine arms, supporting type machine arms, and/or adsorbing type machine arms, etc. Different machine arms 300 may have several different degrees of freedom, for picking objects at different angles.

Figure 5:
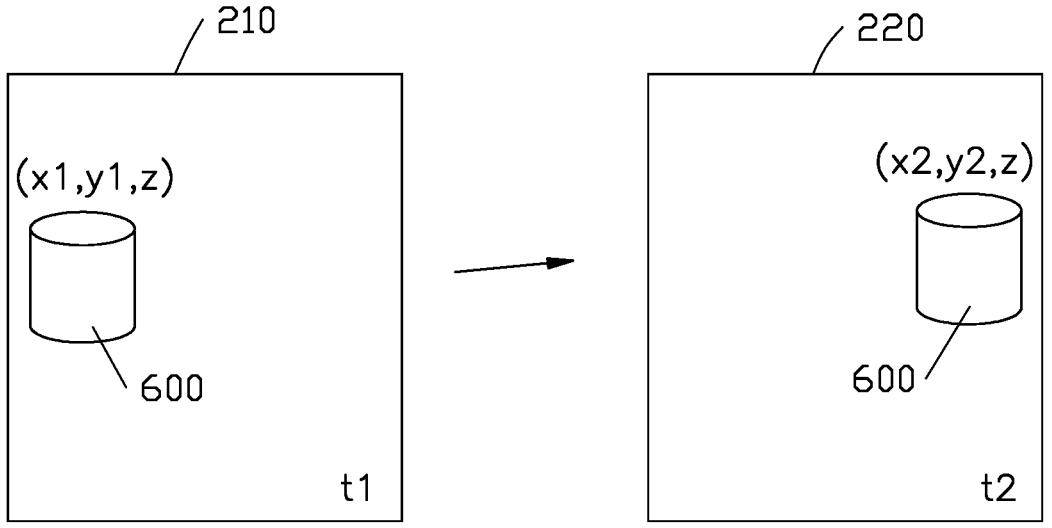
FIG. 5 illustrates a schematic diagram of at least one embodiment of images utilized in the system according to the present disclosure.

FIG. 5 illustrates two images according to at least one embodiment. In at least one embodiment, the operating and processing module 400 is configured to obtain first position information (x1, y1, z) and second position information (x2, y2, z) of the object on the transmission device 100 according to the first image 210 and the second image 220 captured sequentially by the imaging device 200. Based on the first position information (x1, y1, z), the second position information (x2, y2, z), the first time point t1, and the second time point t2, the operating and processing module 400 calculates a moving speed of the object. Based on the first position information (x1, y1, z), the second position information (x2, y2, z), and the moving speed of the object, the operating and processing module 400 calculates a target position and a target time point of the object, and controls the machine arms 300 to pick the object at the target position at the target time point.

The operating and processing module 400 includes, but is not limited to, a central processing unit (CPU), a microprocessor, a digital signal processor (DSP), a graphics processor, an application specific integrated circuit (ASIC), a field-programmable gate array (FPGA), a data processor chip, a programmable logic device (PLD), a discrete gate/transistor logic device, or a discrete hardware component. The operating and processing module 400 may be a control unit and electrically connected to other elements of the system 10 through interfaces or a bus. The operating and processing module 400 may also be a control circuit formed by several tubes or transistors as switches.

The object attributes may include one or more of items of material, color, class, and shape of the object. In at least one embodiment, the memory 700 is configured to store the object attributes, the operating and processing module 400 may obtain material, color, class, and shape of the object according to the object attributes stored in the memory 700 and the images captured by the imaging device 200.

For instance, the material of the object may include polyethylene glycol terephthalate (PET), high polymer polypropylene (PP), polystyrene (PS), high density polyethylene (HDPE), low density polyethylene (LDPE), polyvinyl chloride (PVC), mixed plastic, newspaper, paper box, aluminum, other papers, or other plastic, etc. The color of the object may include white, colorless, transparent, semitransparent, mixed colors, and black, green, red, brown, blue, etc. The class of the object may include food grade, non-food grade, clean, unclean, etc. The shape of the object may include ampliform, flat tray, film, tabulate, cyathiform, barrel, box, etc. The material, color, class, and shape of the object are not limited by the present disclosure.

The imaging device 200, the machine arms 300, and the operating and processing module 400 are in communicably connection. For instance, the imaging device 200 and the machine arms 300 are communicably connected to the operating and processing module 400 through wireless communication technology or wired communication technology, thus, the imaging device 200 and the machine arms 300 can exchange data and information with the operating and processing module 400.

In at least one embodiment, the operating and processing module 400 can be communicably connected to the transmission device 100, to obtain the transmission speed from the transmission device 100. For instance, when the transmission device 100 is a chip-controlled assembly line, the operating and processing module 400 may obtain the transmission speed of the transmission device 100 through the chip in the transmission device 100, the object on the transmission device 100 has the same moving speed as the transmission device 100. In at least one embodiment, after the operating and processing module 400 obtains the position of the object from the imaging device 200, the operating and processing module 400 does not need to calculate the moving speed of the object, but based on the transmission speed of the transmission device 100, the first position information, and the second position information, can calculate the target position and target time point of the object, and control one of the machine arms 300 to move and pick the object at the target position and at the target time point.

In at least one embodiment, the operating and processing module 400 may determine picking targets of the machine arms 300 according to values of objects 600. For instance, when the system 10 is applied in a garbage collection technology filed, the operating and processing module 400 may, based on the object attribute, such as material, color, class, and shape of the objects 600, estimate values of the objects 600, and pick the object(s) 600 with high value according to the estimated values of the objects 600. For another example, when the system 10 is applied in the garbage collection technology filed, the operating and processing module 400 may, based on a predetermined material of an object, input by the operator, pick object(s) 600 of such material, such as preferentially picking the object(s) 600 of PVC material.

Figure 2A:
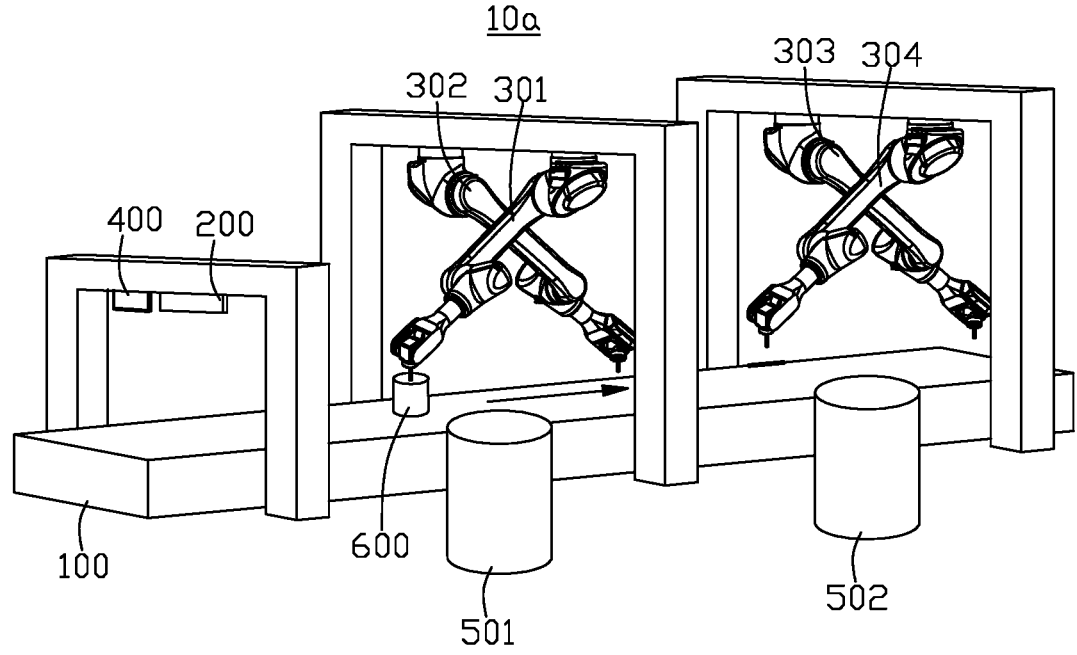
FIGS. 2A and 2B illustrate structural schematic diagrams of at least one embodiment of the system for picking and placing objects according to the present disclosure.
Figure 2B:
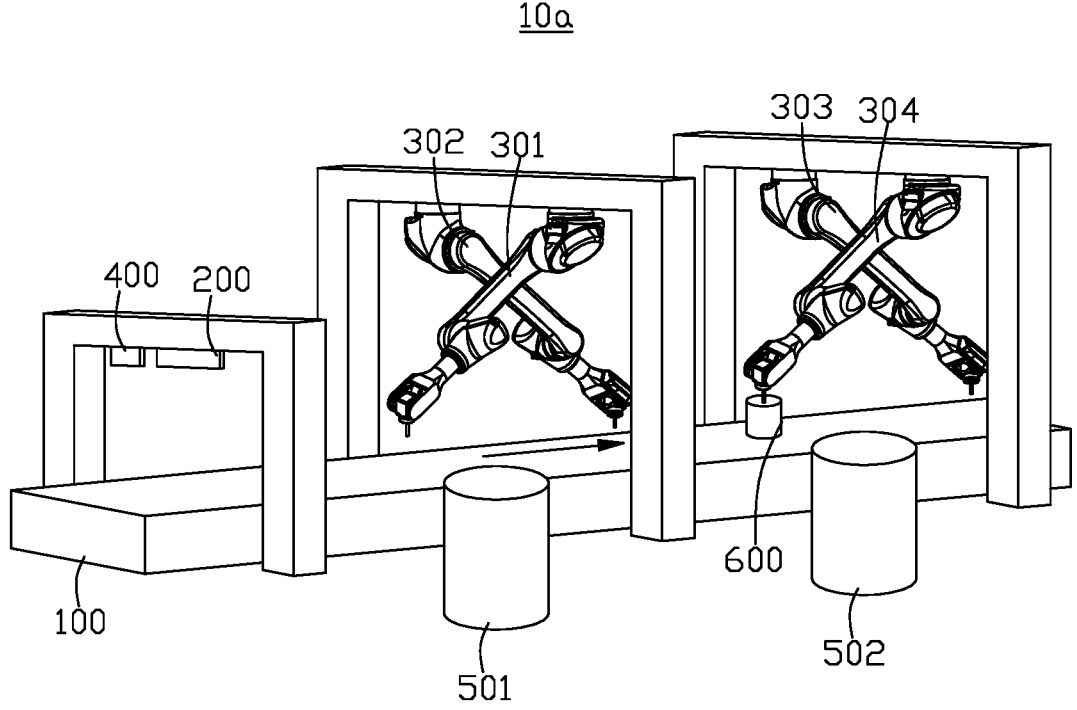

FIGS. 2A and 2B illustrate structural schematic diagrams of at least one embodiment of the system 10a for picking and placing objects according to the present disclosure. The system 10a includes: the transmission device 100, the imaging device 200, a first machine arm 301, a second machine arm 302, a third machine arm 303, a fourth machine arm 304, the operating and processing module 400, a first storage bunker 501, a second storage bunker 502, and the object 600.

Figure 3:
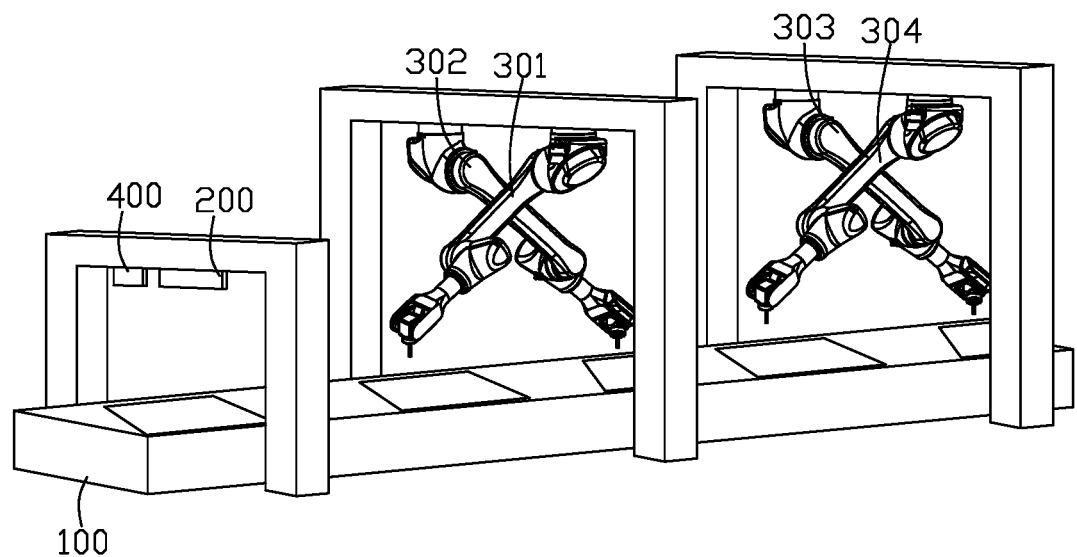
FIG. 3 illustrates a schematic diagram of at least one embodiment of a range of the system for picking and placing objects according to the present disclosure.

FIG. 3 illustrates a schematic diagram of at least one embodiment of a range of the system 10a for picking and placing objects of the system according to the present disclosure.

The imaging device 200 is arranged above the transmission device 100 for capturing images of the transmission device 100. Since the imaging device 200 is fixedly arranged, the image information captured by the imaging device 200 is image information of fixed areas. Furthermore, the first machine arm 301, the second machine arm 302, the third machine arm 303, and the fourth machine arm 304 are corresponding to different areas for picking and placing the object 600 in different positions of the transmission device 100. In at least one embodiment, the picking and placing areas of each of the first machine arm 301, the second machine arm 302, the third machine arm 303, and the fourth machine arm 304 do not overlap with each other. In other embodiments, the picking and placing areas of each of the first machine arm 301, the second machine arm 302, the third machine arm 303, and the fourth machine arm 304 partially overlaps with each other.

Figure 4A:
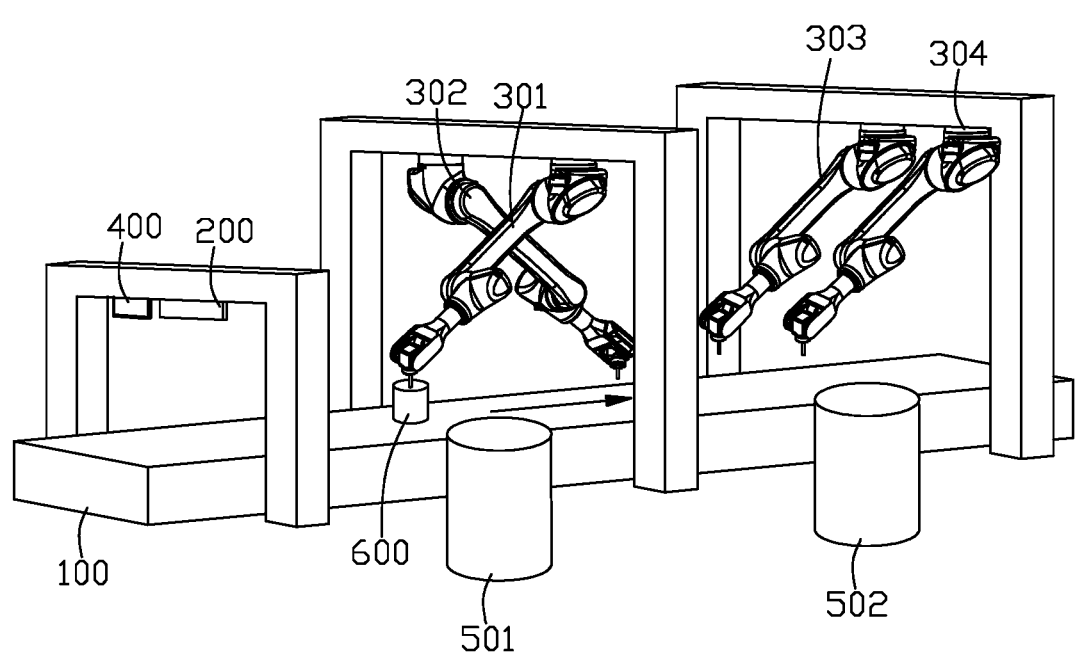
FIGS. 4A and 4B illustrate schematic diagrams of another embodiment of the system for picking and placing objects according to the present disclosure.
Figure 4B:
Figure 4B:
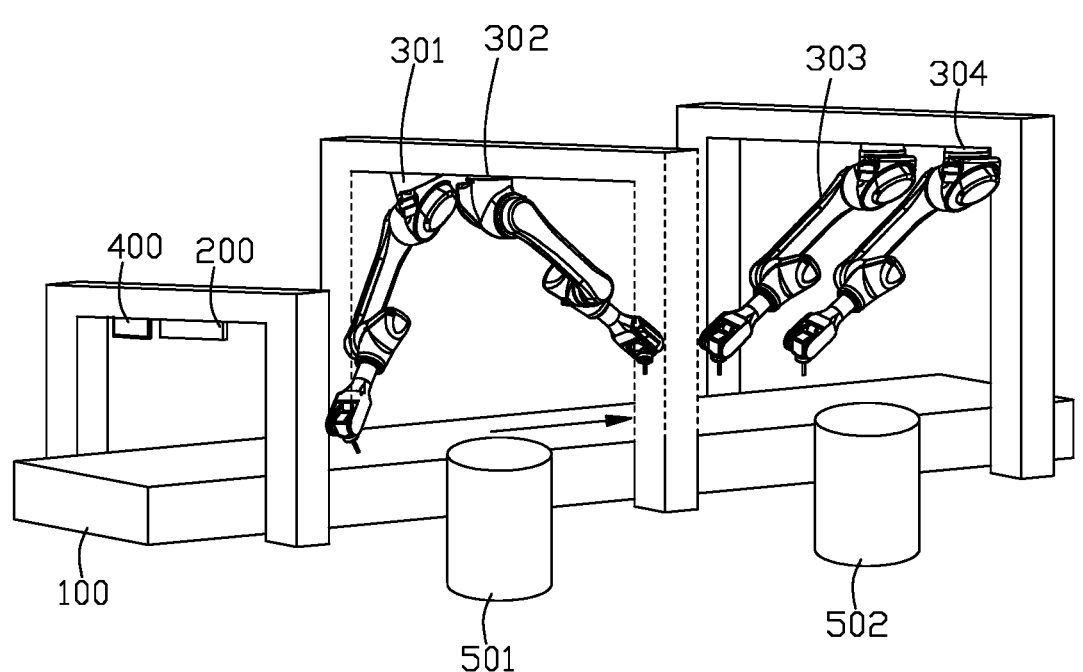

FIGS. 4A and 4B illustrates schematic diagrams of another embodiment of the system for picking and placing objects according to the present disclosure. The system 10b shown in FIGS. 4A and 4B compares to the system 10a shown in FIGS. 2A and 2B, the system 10b may include: the transmission device 100, the imaging device 200, the first machine arm 301, the second machine arm 302, the third machine arm 303, the fourth machine arm 304, the operating and processing module 400, the first storage bunker 501, the second storage bunker 502, and the object 600. The difference includes: the first machine arm 301, the second machine arm 302, the third machine arm 303, the fourth machine arm 304 of the system 10b and the first machine arm 301, the second machine arm 302, the third machine arm 303, the fourth machine arm 304 of the system 10a are in different arrangement. It should be known that, when the machine arms 300 are in a different arrangement, the picking and placing areas corresponding to the machine arms 300 are also different. In at least one embodiment, the machine arms 300 may be differently arranged, for instance, the first machine arm 301 may be arranged in a top left, the second machine arm 302 may be arranged in a low right, the third machine arm 303 may be arranged in a top right, the fourth machine arm 304 may be arranged in a low left. In at least one embodiment, the first machine arm 301 and the second machine arm 302 may be symmetrical around a transmission direction of the object 600, that is a central axis of the first machine arm 301 and a central axis of the second machine arm 302 may be coplanar and symmetrical around the transmission direction of the object 600. In at least one embodiment, the first machine arm 301 and the second machine arm 302 may be symmetrically arranged on a left side and a right side along the transmission direction of the object 600, that is the central axis of the first machine arm 301 and the central axis of the second machine arm 302 may be coplanar and symmetrically arranged on the left side and the right side along the transmission direction of the object 600. In at least one embodiment, lengths of the machine arms 300 may be different.

It should be known that, the arrangement of the first machine arm 301, the second machine arm 302, the third machine arm 303, and the fourth machine arm 304 shown in FIGS. 2A, 2B, 4A, 4B are merely examples, a number and the arrangement of the machine arms 300 of the system 10a and the system 10b are not limited by the present disclosure.

Operating processes of the system 10a and the system 10b are as follow.

In at least one embodiment, a plurality of objects 600 are placed on the transmission device 100, the objects 600 are transmitted along a predetermined direction by the transmission device 100 after the transmission device 100 is activated, such as an arrow direction as shown in FIGS. 2A and 2B.

After the transmission device 100 is activated, the imaging device 200 continuously captures at least two two-dimensional and three-dimensional fused images, and transmits same to the operating and processing module 400. The operating and processing module 400 identifies same objects 600 according to the at least two two-dimensional and three-dimensional fused images. The operating and processing module 400 further obtains object attributes of the objects 600 and object attributes to be picked. For instance, when the system 10a and the system 10b determine that preferentially picking objects with the PET material, the operating and processing module 400 marks the objects 600 with object attribute of PET as target objects 600.

The operating and processing module 400 obtains position information of the target objects 600 in the two fused images according to depth information of the two fused images, and based on a time difference between the two fused images, calculates a moving speed of each target object 600.

The operating and processing module 400 calculates a target position and a target time point of each target object 600 according to the moving speed of each target object 600, obtains a picking and placing area relative to the machine arms, and selects a target machine arm according to the target position of each target object 600, that is assigning one particular machine arms to pick different target objects 600. For instance, when the first machine arm 301 is picking one target object 600, the fourth machine arm 304 may be picking another target object 600.

The machine arms 300 may place the objects 600 to a corresponding storage bunker according to the positions. For instance, the first machine arm 301 and the second machine arm 302 may place the objects 600 in the first storage bunker 501, and the third machine arm 303 and the fourth machine arm 304 may place the objects 600 to the second storage bunker 502.

It should be known that, the transmission device 100 may simultaneously transmit objects 600 of different types. The machine arms 300 of the system 10a, 10b may be configured to pick objects 600 of a predetermined type. The predetermined type of the objects 600 may be indicated as a picking attribute of the machine arms 300. In detail, this is relating the machine arms 300 with the object attributes, and setting different machine arms 300 to pick objects 600 with different object attributes. For instance, the first machine arm 301 is configured to pick objects 600 with PET material, the second machine arm 302 is configured to pick objects 600 with PP material, the third machine arm 303 is configured to pick objects 600 with PS material, and the fourth machine arm 304 is configured to pick objects 600 with PVC material. In at least one embodiment, different machine arms 300 may be set to pick objects 600 with the same object attributes. For instance, the first machine arm 301 and the second machine arm 302 are configured to pick objects 600 with PET material, the third machine arm 303 and the fourth machine arm 304 are configured to pick objects 600 with PVC material. For another example, the first machine arm 301, the second machine arm 302, the third machine arm 303, and the fourth machine arm 304 are all configured to pick objects 600 with PP material, not being limited by the present disclosure.

Figure 6:
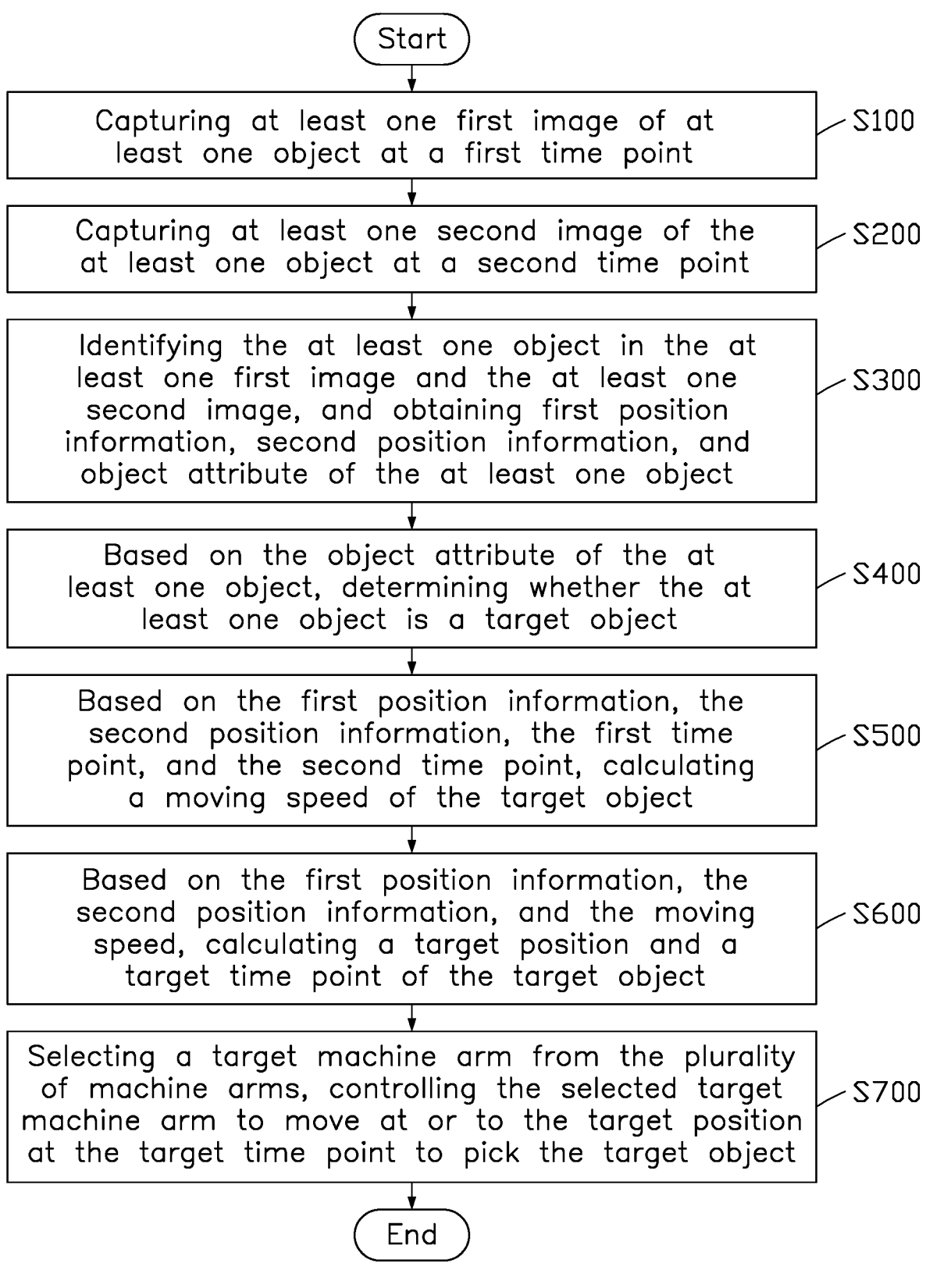
FIG. 6 illustrates a flowchart of at least one embodiment of a method for picking and placing objects according to the present disclosure.

FIG. 6 illustrates a flowchart of at least one embodiment of a method for picking and placing objects. The method may be applied in the system 10 as shown in FIG. 1, the system 10a as shown in FIGS. 2A and 2B, or the system 10b as shown in FIGS. 4A and 4B. The method is provided by way of example, as there are a variety of ways to carry out the method. Each block shown in FIG. 6 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block S100. The method includes:

At block S100, capturing at least one first image of at least one object at a first time point.

In the block S100, the imaging device 200 is configured to capture at least one first image 210 of at least one object 600 on the transmission device 100 at the first time point, described in FIGS. 1 to 5.

At block S200, capturing at least one second image of the at least one object at a second time point.

In the block S200, the imaging device 200 is configured to capture at least one second image 220 of the at least one object 600 on the transmission device 100 at the second time point, described in FIGS. 1 to 5.

At block S300, identifying the at least one object in the at least one first image and the at least one second image, and obtaining first position information, second position information, and object attribute of the at least one object.

In the block S300, the operating and processing module 400 is configured to identify the at least one first image 210 and the at least one second image 220 to obtain first position information, second position information, and object attribute of the at least one object 600 on the transmission device 100, described in FIGS. 1 to 5.

At block S400, based on the object attribute of the at least one object, determining whether the at least one object is a target object.

In the block S400, the operating and processing module 400 is further configured to, based on the object attribute of the at least one object 600, determine whether the at least one object 600 is the target object 600, described in FIGS. 1 to 5.

At block S500, based on the first position information, the second position information, the first time point, and the second time point, calculating a moving speed of the target object.

In the block S500, the operating and processing module 400 is further configured to, based on the first position information, the second position information, the first time point, and the second time point, calculate the moving speed of the target object 600, described in FIGS. 1 to 5.

At block S600, based on the first position information, the second position information, and the moving speed, calculating a target position and a target time point of the target object.

In the block S600, the operating and processing module 400 is further configured to, based on the first position information, the second position information, and the moving speed, calculate the target position and the target time point of the target object 600, described in FIGS. 1 to 5.

At block S700, selecting a target machine arm from the plurality of machine arms, controlling the selected target machine arm to move at or to the target position at the target time point to pick the target object.

In the block S700, the operating and processing module 400 is further configured to select a target machine arm 300 from the plurality of machine arms 300, control the target machine arm 300 to move at or to the target position at the target time point to pick the target object 600, described in FIGS. 1 to 5.

In at least one embodiment, the system 10, the system 10a, and the method for picking and placing objects may be applied in the garbage collection technology filed. When operating garbage collection, traditionally selecting garbage with high value or predetermined type of garbage from the garbage heap, and burying the rest of garbage. Since there are different types of garbage and complicated conditions on site, it's hard to arrange automatic apparatus, thus the traditional garbage collection technology filed is manually operated for classification. The system 10 for picking and placing objects of the present disclosure may obtain the moving speed of the garbage and garbage attribute according to at least two images, determine the garbage to be picked according the garbage attribute, determine the position for picking the garbage according to the moving speed of the garbage, and control the machine arm to precisely pick the garbage to be picked according to the determined position and the moving speed, which having advantages of easy arrangement and high picking precision.

The system 10, the system 10a, and the method for picking and placing objects may obtain the object 600 and the object attribute according to at least two images, determine the object 600 to be picked according the object attribute, determine the position for picking the object 600 according to the moving speed of the object 600, and control the machine arm 300 to precisely pick the object 600 to be picked according to the determined position and the moving speed, which having advantages of easy arrangement and high picking precision.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A method for picking and placing objects applied in a system for picking and placing objects, the system comprising a plurality of machine arms and a transmission device, the transmission device being configured to transmit at least one object in a predetermined direction, the method comprising:

capturing, by an imaging device arranged above the transmission device, at least one first image of the at least one object at a first time point;

capturing, by the imaging device, at least one second image of the at least one object at a second time point;

identifying, by an operating and processing module connected to the transmission device, the imaging device, and the plurality of machine arms, the at least one object in the at least one first image and the at least one second image; and obtaining first position information, second position information, and at least one object attribute of the at least one object;

based on the first position information, the second position information, the first time point, and the second time point, calculating, by the operating and processing module, a moving speed of the at least one object;

based on the at least one object attribute of the at least one object, determining, by the operating and processing module, whether the at least one object is a target object;

in a case that the at least one object is determined to be the target object, calculating, by the operating and processing module, a target position and a target time point of the target object based on the first position information, the second position information, and the moving speed;

selecting, by the operating and processing module, a target machine arm from the plurality of machine arms; and controlling, by the operating and processing module, the target machine arm selected from the plurality of machine arms to move at or to the target position at the target time point to pick the target object.

2. The method according to claim 1, wherein the at least one object attribute of the at least one object comprises material, color, class, and shape.

3. The method according to claim 1, further comprising:

controlling, by the operating and processing module, the target machine arm selected from the plurality of machine arms to place the target object to a corresponding storage bunker.

4. The method according to claim 1, wherein the first position information, the second position information, and the at least one object attribute of the at least one object are obtained by:

obtaining, by the operating and processing module, depth information of the at least one object in the at least one first image and the at least one second image, and the moving speed of the at least one object is calculated based on a time difference between the at least one first image and the at least one second image.

5. The method according to claim 1, wherein each first image of the at least one first image and each second image of the at least one second image is a two-dimensional and three-dimensional fused image comprising depth information.

6. The method according to claim 1, wherein selecting the target machine arm from the plurality of machine arms comprises:

relating, by the operating and processing module, the plurality of machine arms with at least one picking attribute; and based on a related picking attribute of the at least one machine arm and the at least one object attribute of the target object, selecting, by the operating and processing module, the target machine arm from the plurality of machine arms.

7. The method according to claim 6, wherein each machine arm of the plurality of machine arms has a picking attribute of the at least one picking attribute different from the picking attributes of the at least one picking attribute of other machine arms of the plurality of machine arms.

8. The method according to claim 1, wherein selecting the target machine arm from the plurality of machine arms comprises:

obtaining, by the operating and processing module, picking-and-placing areas of each machine arm of the plurality of machine arms;

based on the picking-and-placing areas of the plurality of machine arms and the target position of the target object, selecting, by the operating and processing module, the target machine arm from the plurality of machine arms.

9. The method according to claim 8, wherein the picking-and-placing areas of each machine arm of the plurality of machine arms do not overlap with each other the picking-and-placing areas of other machine arms of the plurality of machine arms.

10. The method according to claim 8, wherein the picking-and-placing areas of each machine arm of the plurality of machine arms partially overlaps with the picking-and-placing areas of other machine arms of the plurality of machine arms.

11. A system for picking and placing objects, the system comprising:

a transmission device configured to transmit at least one object in a predetermined direction;

an imaging device arranged above the transmission device, the imaging device configured to capture at least one first image of the at least one object at a first time point and at least one second image of the at least one object at a second time point;

a plurality of machine arms, each of the plurality of machine arms configured to pick and place the at least one object; and an operating and processing module connected to the transmission device, the imaging device, and the plurality of machine arms, the operating and processing module configured to:

identify the at least one object in the at least one first image and the at least one second image; and obtaining first position information, second position information, and at least one object attribute of the at least one object;

based on the first position information, the second position information, the first time point, and the second time point, calculate a moving speed of the at least one object;

based on the at least one object attribute of the at least one object, determine whether the at least one object is a target object;

in a case that the at least one object is determined to be the target object, calculate a target position and a target time point of the target object based on the first position information, the second position information, and the moving speed;

select a target machine arm from the plurality of machine arms; and control the target machine arm selected from the plurality of machine arms to move at or to the target position at the target time point to pick the target object.

12. The system according to claim 11, wherein the at least one object attribute of the at least one object comprises material, color, class, and shape.

13. The system according to claim 11, wherein the operating and processing module is further configured to:

control the target machine arm selected from the plurality of machine arms to place the target object to a corresponding storage bunker.

14. The system according to claim 11, wherein the operating and processing module is further configured to:

obtain depth information of the at least one object in the at least one first image and the at least one second image, and based on a time difference between the at least one first image and the at least one second image, calculate the moving speed of the at least one object.

15. The system according to claim 11, wherein each first image of the at least one first image and each second image of the at least one second image is a two-dimensional and three-dimensional fused image comprising depth information.

16. The system according to claim 11, wherein the operating and processing module is further configured to:

relate the plurality of machine arms with at least one picking attribute; and based on a related picking attribute of the at least one machine arm and the at least one object attribute of the target object, select the target machine arm from the plurality of machine arms.

17. The system according to claim 16, wherein each machine arm of the plurality of machine arms has a picking attribute of the at least one picking attribute different from the picking attributes of the at least one picking attribute of other machine arms of the plurality of machine arms.

18. The system according to claim 11, wherein the operating and processing module is further configured to:

obtain picking-and-placing areas of each machine arm of the plurality of machine arms;

based on the picking-and-placing areas of the plurality of machine arms and the target position of the target object, select the target machine arm from the plurality of machine arms.

19. The system according to claim 18, wherein the picking-and-placing areas of each machine arm of the plurality of machine arms do not overlap with the picking-and-placing areas of other machine arms of the plurality of machine arms.

20. The system according to claim 18, wherein the picking-and-placing areas of each machine arm of the plurality of machine arms partially overlaps with the picking-and-placing areas of other machine arms of the plurality of machine arms.

\* \* \* \* \*